Jan. 14, 1969
C. K. HIRSCH
3,421,631
STRAINER GASKET FOR SANITARY PIPING SYSTEMS
Filed Oct. 22, 1965
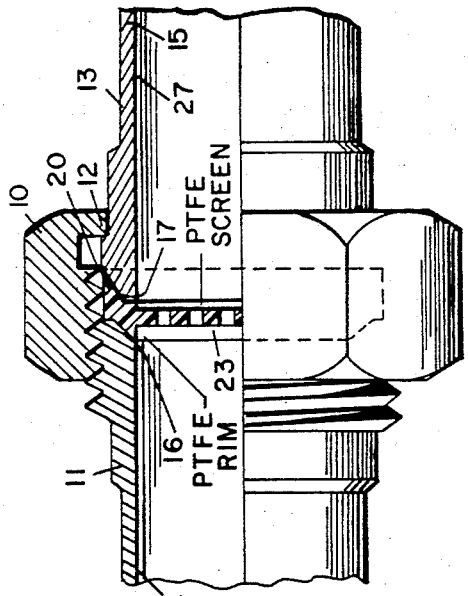
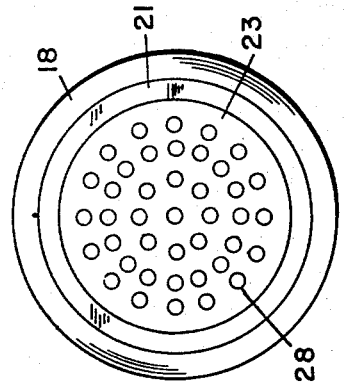
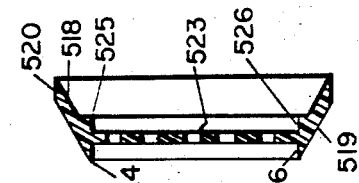
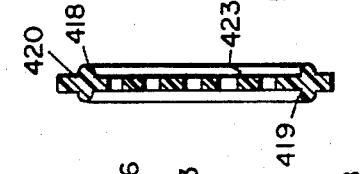
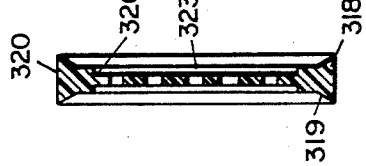
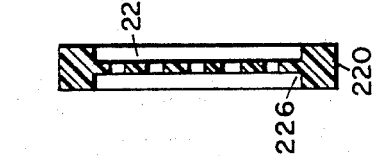
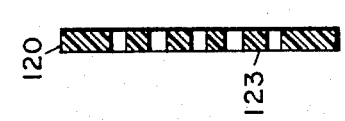
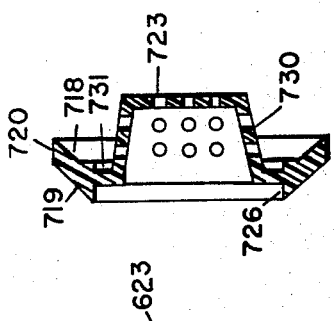
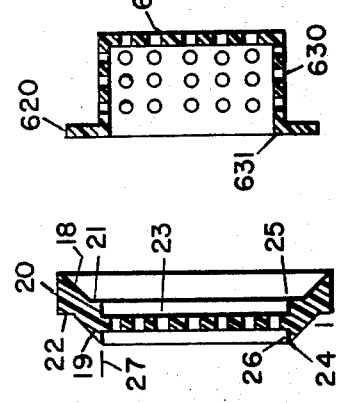
CHARLES K. HIRSCH
*INVENTOR.*
BY
*Karl F. Ross*
*Attorney*

United States Patent Office 3,421,631
Patented Jan. 14, 1969

3,421,631
STRAINER GASKET FOR SANITARY PIPING SYSTEMS
Charles K. Hirsch, 195 Claremont Ave.,
New York, N.Y. 10027
Filed Oct. 22, 1965, Ser. No. 501,003
U.S. Cl. 210—445                                     2 Claims
Int. Cl. B01d 35/02

ABSTRACT OF THE DISCLOSURE

An assembly for sanitary pipe systems in which a pair of coupling members of an identical internal diameter are interengageable and have complementarily interfittable sealing surfaces and a rigid nylon, a polytetrafluorethylene or synthetic rubber gasket received between these members and composed in one piece with an imperforate rim having faces engaged by the sealing surfaces of complementary configuration while a perforate web of substantially the internal diameter of the members spans the rim.

---

My present invention relates to strainers for sanitary piping systems of the type generally described in my prior Patent No. 2,985,470 issued May 23, 1961.

In the aforementioned patent, I describe a pipe coupling for sanitary pipe lines which includes a gasket of an acid-resistant resilient plastic material whose configuration is such as to permit the gasket to be positively located between the beveled sealing surfaces of the interfitting parts of a pipe union or other coupling devices.

In connection with sanitary piping systems, it is frequently desirable to provide means for blocking the through-flow of impurities and for straining or filtering such impurities from the liquid entraining same and flowing through the pipe. It has been proposed, in this connection, to provide a strainer assembly having a reinforced rim into which a screen, grid or perforated flat material is introduced and fixed by clamping or the like and to dispose the resulting strainer between two coupling members of a pipe system. In general, such arrangements were disadvantageous because of the fact that corrosion often developed between the grid and the support rim or along each of these members remote from their junction. Moreover, assemblies of this type were found to be unsatisfactory inasmuch as the crevices between the screen member and the reinforcing rim often were contaminated with the impurities while cleaning was difficult if not impossible. In fact, health officials discourage the use of assemblies of this type in sanitary pipe lines for milk and other edibles whether these systems are cleaned in place (CIP) or are disassembled for cleaning. Thus, it has been impractical heretofore to provide a screen assembly for sanitary pipe lines which does not present crevices for accumulation of impurity materials, was resistant to corrosion, was inexpensive and was adaptable to existing installations without the use of complex strainer housings.

It is, therefore, a principal object of this invention to provide a strainer for the purposes described which will be free of the stated disadvantages and which can be used without creating health hazards in sanitary pipe lines.

A more specific object of this invention is to provide a pipe coupling and a strainer therefore which will be adaptable to existing coupling members, will be resistant to corrosion by acid and alkali, which will present no crevices for contamination by the impurities and which is relatively inexpensive of manufacture.

These objects and others which will become apparent hereinafter are attained, in accordance with the present invention, by providing a unitary gasketing screen of an acid-resistant synthetic resin (especially nylon or polytetrafluoroethylene—i.e. Teflon or PTFE) or a synthetic resin which comprises a thin perforated web screening the cross-section of the pipe system and surrounded by an imperforate rim portion clampable between a pair of coupling members and, advantageously, of an enlarged thickness with a profile designed to reinforce the device when forming a sealing rim in the manner of a gasket of the type described in the aforementioned patent. I have found that this combination unitary strainer and gasket is of surprising effectiveness for use in sanitary pipe lines between a pair of coupling members because the integral or single-body construction of the screen and gasket portions ensures the absence of crevices which otherwise would collect waste and contaminants. Furthermore, when the unit is composed of nylon or polytetrafluoroethylene or the like, there is no deterioration even in concentrated corrosive liquids while the inherent resiliency of the device ensures that a proper seal will be maintained between the compression surfaces of the coupling.

In all cases, it may be stated that the perforated web or screen should lie predominantly in a plane extending perpendicularly to the axis of the device and should form a junction with the rim at a median plane therethrough at the annular shoulder formed at this junction. Advantageously, the coupling is so arranged that this annular shoulder is of a diameter precisely corresponding to the inner diameter of the pipe assembly in which the seal and gasket are disposed.

The above and other objects, features and advantages of this invention will become more readily apparent from the following description, reference being made to the accompanying drawing in which:

FIG. 1 is a fragmentary axial cross-sectional view of a sanitary-pipe system provided with a screen and gasket device in accordance with the present invention;

FIG. 2 is a plan view of the gasket; and

FIGS. 3–10 are axial cross-sectional views illustrating various embodiments of the strainer construction.

Referring first to FIG. 1, it will be seen that a pipe coupling, in accordance with this invention, can consist of a conventional union whose female member 10 is a nut threadedly engaging the male member 11 and retained in the axial direction by a flange 12 upon the pipe 13 carrying the nut 10. Thus, upon threaded interengagement of the male and female members 10, 11 the sections 11 and 13 are axially drawn together in axial alignment so that their inner surfaces 14 and 15, which are of identical inner diameter, are defined by a common cylinder. The sections 14 and 15 are provided with respective beveled abutment surfaces 16 and 17 conforming substantially to the beveled faces 18 and 19 (FIG. 8) of a gasket 20 of polytetrafluoroethylene (PTFE). The beveled surfaces 18 and 19 form with respective surfaces 21 and 22 parallel to the plane of a screen portion 23 a profiled rim of an axial thickness in excess of that of the screen 23 which forms a unitary body with the rim. The assembly can be stamped or pressed in a single unit although a relatively thick cylindrical body of the material can be machined to form the web which may thereafter be perforated by punching or the like. The web 23 (FIGS. 2 and 8) lies in a plane P midway between the edges 24 and 25 defining the rim 20 at its junction with the screen 23. I have also found it to be important to ensure that the shoulder 26 of the rim is coextensive with the bore 27 of the pipe. It will be evident, therefore, that the gasket and screen have an inner conical surface defining the bevel 18 and an outer conical surface defining the bevel 19 with the shoulders 21 and 22 being flush with respective surfaces of the pipe members. It will be evident that the beveled compression surfaces 18 and 19 coact with the coupling members 14 and 15 to ensure sealing engagement with the gasket and have no crevices for accumulating contaminants. FIG. 2 shows a plan view of the gasket shown in cross-section in FIGS. 1 and 8 wherein the perforations 28 are indicated to be circular. It will be noted, however, that, in this gasket strainer, polygonal (e.g. square) apertures can also be provided.

In FIG. 3, I show another arrangement wherein the gasket rim 120 is not perforated but is not enlarged and thus acts as a "paper thin" gasket and strainer by virtue of the perforated central zone 123 surrounded by the rim 120. In this case, the gasket 120, 123 is clamped between a pair of compression surfaces lying in planes perpendicular to the axis of the gasket. In the system of FIG. 4, the enlarged rim 120 is shown to be prismatic with a square cross-section and enlarged with respect to perforated web 223 which lies along a median plane through the rim. Here, too, the shoulder 226 is coextensive with the inner wall of the pipe sections and the compression surfaces engaging the rim 220 extend perpendicularly to the axis of the gasket. The compression surfaces of the union members engaging the rim 320 of FIG. 5 are beveled complementarily to the conical surfaces 318 and 319 of the rim whose shoulder 326 forms the junction with the perforated screen portion 323. In the modification of FIG. 6, the imperforate rim 420 is provided with annular ribs 418 and 419 on the opposite faces of this rim to be received within respective channels in the compression faces of the pipe union. The perforated portion 423 joins the rim 420 inwardly of the ribs 418 and 419.

A particularly useful configuration is that shown in FIG. 7 since the rim 520 is provided with an inner conical surface 518 and an outer conical surface 519 conforming to the sealing surfaces of the most common type of pipe union. The rim is thus generally frustoconical and joins the perforated web 523 at the shoulders 526, the web 523 lying intermediate the edges 524, 525. The web may, according to this invention, be generally cup-shaped to form a gasket capable of accumulating large quantities of contaminants prior to disassembling of the coupling (to remove the gasket and strainer arrangement or to provide a greater perforated area). Such cup-shaped systems are illustrated in FIGS. 9 and 10 although it will be understood that the cup-shaped screens of FIGS. 9 and 10 are equally satisfactory with the rims of FIGS. 4 to 6 and 8. In FIG. 9, the rim 620 forms a flat-seat gasket engageable by the sealing surfaces of the coupling which are perpendicular to the axis. Here, the cup-shaped screen 623 has a perforated cylindrical wall 630 which joins the rim 620 at an angular junction 631. A similar cup-shaped screen is provided at 723 in the strainer gasket of FIG. 10 whose rim 720 has the conical faces 718 and 719, corresponding to the faces of the rim of FIG. 7. An outwardly turned annular imperforate flange 731 interconnects the perforated frustoconical wall 730 of this cup-shaped screen with the rim 720 whose shoulders 726 are coextensive with the inner surface of the pipe coupling.

In the systems of FIGS. 3–7, 9 and 10, as in the arrangement described with respect to FIGS. 1, 2 and 8, the screen portion is of unitary construction with the rim, i.e. formed from a single piece of synthetic resin, preferably polytetrafluoroethylene.

The invention described and illustrated is believed to admit of any modifications within the ability of persons skilled in the art, all such modifications being considered within the spirit and scope of the appended claims.

I claim:

1. A coupling for a sanitary pipe system, comprising a pair of threadedly interconnectable coupling pipe members with juxtaposed annular sealing surfaces, and a strainer gasket clamped between said sealing surfaces and consisting of a one-piece body of nylon, polytetrafluoroethylene or synthetic rubber having an imperforate annular rim engageable by said sealing surfaces and a perforated strainer web spanning substantially the entire inner space of said rim and substantially the entire cross-section of said pipe members, said annular sealing surfaces being generally conical and parallel to one another and said rim of said strainer gasket having a thickness in excess of that of said web and being provided with a pair of faces on opposite sides of the rim complementarily engageable by said sealing surfaces of said members, said pipe members having substantially identical inner diameters and said rim joining said web along a pair of cylindrical shoulders having inner diameters equal to those of said pipe members and substantially coextensive with the inner walls of said pipe members, said cylindrical shoulders being disposed on opposite sides of said web.

2. A coupling as defined in claim 1 wherein said web is generally cup-shaped.

References Cited

UNITED STATES PATENTS

| 1,140,758 | 5/1915 | Miller | 210—445 |
| 1,236,100 | 8/1917 | Nance | 210—445 X |
| 2,127,397 | 8/1938 | Freedlander | 55—503 X |
| 2,775,350 | 12/1956 | Jones | 210—446 |
| 2,843,054 | 7/1958 | Crake | 103—220 |
| 2,879,543 | 3/1959 | McDermott | 210—445 X |
| 2,985,470 | 5/1961 | Hirsch | 285—332.3 |
| 3,168,468 | 2/1965 | Jagdmann | 210—445 X |

FOREIGN PATENTS

| 1,050,164 | 2/1959 | Germany. |

SAMIH N. ZAHARNA, *Primary Examiner.*

FRANK A. SPEAR, JR., *Assistant Examiner.*

U.S. Cl. X.R.

210—446, 450